US011312154B2

(12) United States Patent
Petschik et al.

(10) Patent No.: US 11,312,154 B2
(45) Date of Patent: Apr. 26, 2022

(54) METHOD AND DEVICE FOR IMPROVING THE PRINT IMAGE UNIFORMITY OF A PRINTED PRINT IMAGE

(71) Applicant: Canon Production Printing Holding B.V., Venlo (NL)

(72) Inventors: Benno Petschik, Markt Schwaben (DE); Ruediger Lippok, Eching (DE); Leo Totschnig, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 82 days.

(21) Appl. No.: 17/067,258

(22) Filed: Oct. 9, 2020

(65) Prior Publication Data

US 2021/0107292 A1 Apr. 15, 2021

(30) Foreign Application Priority Data

Oct. 11, 2019 (DE) .......................... 102019127402.8

(51) Int. Cl.
*B41J 2/21* (2006.01)
*B41J 2/045* (2006.01)
*G06K 15/02* (2006.01)
*H04N 1/60* (2006.01)

(52) U.S. Cl.
CPC .......... *B41J 2/2139* (2013.01); *B41J 2/0456* (2013.01); *B41J 2/04586* (2013.01); *B41J 2/2121* (2013.01); *G06K 15/027* (2013.01); *B41J 2/2146* (2013.01); *H04N 1/6041* (2013.01)

(58) Field of Classification Search
CPC .... B41J 2/2139; B41J 2/0456; B41J 2/04586; B41J 2/2121; B41J 2/2146; G06K 15/027; H04N 1/6041
See application file for complete search history.

(56) References Cited

U.S. PATENT DOCUMENTS

| | | | |
|---|---|---|---|
| 8,317,283 B2 | 11/2012 | Makuta et al. | |
| 9,302,474 B2 | 4/2016 | Koerner et al. | |
| 2014/0002536 A1* | 1/2014 | Chen | ............ B41J 2/04508 347/19 |
| 2020/0023649 A1* | 1/2020 | Fukuda | ................ G06K 15/027 |

FOREIGN PATENT DOCUMENTS

| | | |
|---|---|---|
| DE | 102013107942 A1 | 1/2015 |
| DE | 102014106424 A1 | 11/2015 |
| EP | 2202083 A1 | 6/2010 |
| JP | 2004122411 A * | 4/2004 ............ B41J 29/393 |
| JP | 2004122411 A | 4/2004 |

OTHER PUBLICATIONS

German Action dated Jun. 22, 2020, Application No. 10 2019 127 402.8.

* cited by examiner

*Primary Examiner* — Yaovi M Ameh
(74) *Attorney, Agent, or Firm* — The Webb Law Firm

(57) ABSTRACT

In a device and a method for improving the print image uniformity, at least one print image is printed by a printer with at least one print bar that has at least one print head with a plurality of print nozzles. An image detector having a plurality of dot/image detection regions detects at least one value profile of measured inking intensities. A comparator compares the value profile with at least one reference value, and generates correction values dependent thereon.

16 Claims, 5 Drawing Sheets

METHOD AND DEVICE FOR IMPROVING THE PRINT IMAGE UNIFORMITY OF A PRINTED PRINT IMAGE

CROSS REFERENCE TO RELATED APPLICATIONS

This patent application claims priority to German Patent Application No. 102019127402.8, filed Oct. 11, 2019, which is incorporated herein by reference in its entirety.

BACKGROUND

Field

The disclosure relates to a method and a device for improving the print image uniformity of a print image printed with the aid of a printer, via an image detector.

Related Art

Given known methods and devices for detecting, via an image detector, a print image printed with the aid of a printer, a first print image printed onto a recording medium with a predetermined first coloration intensity in a primary color of the printer is detected line by line, transverse to the printing direction, with the aid of the image detector, wherein the image detector has a plurality of dot detection regions arranged side by side for per-dot detection of the first or a second printed print image. From the first print image detected per dot, a real value of a property of the print image is determined for each image region of the print image detected per dot over the printable width of the recording medium.

A method for compensation of streaking in a print image printed in raster printing in a digital printer is known from the document DE 10 2013 107 942 A1. Correction values are hereby determined for each printing element of the print head for the entire tonal value curve, which correction values are stored in a correction table. To determine the correction values, a test print image is printed onto a substrate material and scanned with the aid of a scanner in order to determine the intensity values (tonal values) of the test print image.

A fundamental object exists in the homogenization of a print image over the print width given a uniform nominal inking. An optical detection unit, for example an RGB line camera, detects a printed test print image, wherein the uniformity of the print image is determined based on the detected print image. However, the problem occurs that the optical detection unit, in particular RGB line cameras, incur errors in the detected print image, which errors are in particular to be ascribed to imaging errors and detection errors of the image sensors, in particular detection errors of CCD sensors. If a correction of the inking intensity is then implemented on the basis of an incorrectly detected print image, this often even results in a degradation of the print image. In particular, via measurements and tests it was found that errors occurred in the image detection of individual regions of a print image. In particular, the intensity measurement is simply not constant over the scan width of an RGB camera that is used, in spite of a print image with constant inking intensity over the print width of the recording medium. This in particular occurs strongly in the blue channel of the RGB camera used here, such that an inhomogeneous detection of the print image over the entire detection width or scan width was hereby established.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
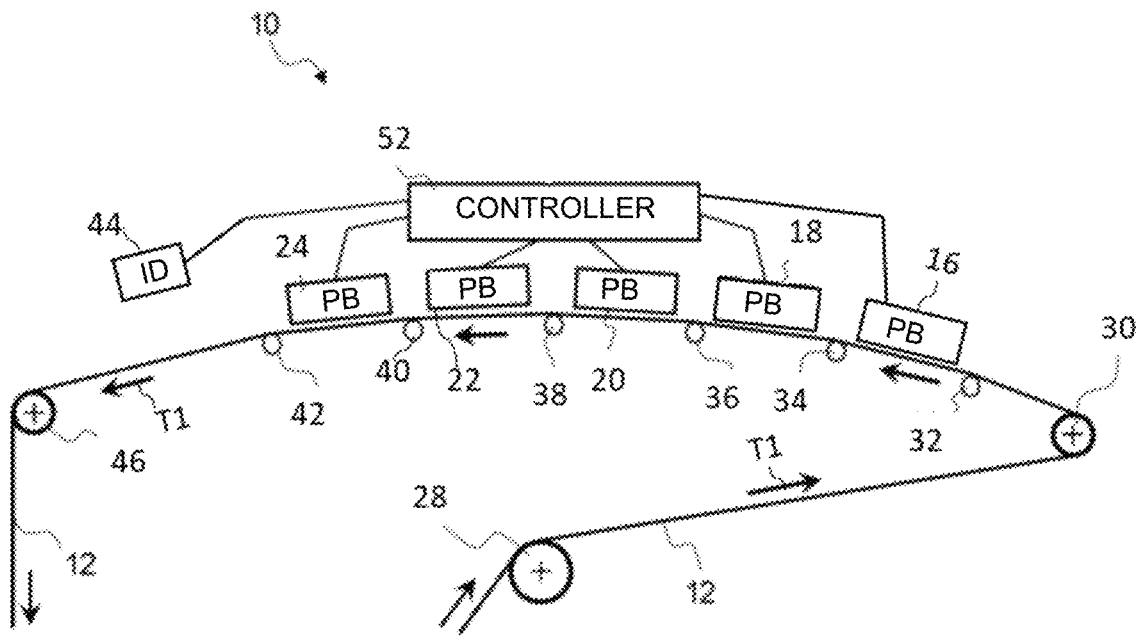
FIG. 1 illustrates a printing device according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to specify a method and a device for improving the print image uniformity of a print image printed with the aid of a printer, via an image detector.

According to an exemplary embodiment of the disclosure, to calibrate the image detector, at least one first print image is printed by the printer with a first real inking intensity, wherein the inking intensity on the recording medium is essentially constant over the width of the first print image. The first print image is subsequently detected, and at least one first measured value profile is generated by the image detector. The first value profile is then compared with a first reference and, depending on the comparison, first correction values are stored by the comparator for the image detector.

In combination therewith or as an alternative thereto, according to the disclosure at least one second print image is printed by the printer with a second nominal inking intensity to calibrate said printer, wherein the inking intensity on the recording medium should be constant over the width of the second print image. The second print image is subsequently detected, and at least one second measured value profile is generated by the image detector, which outputs an essentially constant value profile across all dot detection regions given an inking intensity that is constant on a recording medium. The second measured value profile is subsequently compared with a second reference value and, depending on the comparison, second correction values are stored by the comparator for print nozzles, at least one print head, and/or print bars.

In an exemplary embodiment, a respective correction value for the respective image detection region of the image detector may be determined and stored via the detection of a first print image having a uniform area coverage and a predetermined (constant) inking intensity over the print width of the recording medium. The image detector may therewith be calibrated to the predetermined inking intensity. This predetermined inking intensity corresponds to the inking intensity that the actual first print image printed on the recording medium exhibits. The first print image is preferably printed with a single primary color of the image detector, wherein the detection of correction values for each primary color may be implemented separately for each color channel (for example red, green, blue) of the image detector. A plurality of different inking intensities of a primary color may also be printed per line or per region, which inking intensities are then detected with the aid of the image detector, wherein corresponding correction value profiles for the individual dot detection regions are determined for each predetermined (nominal) inking intensity. An inking intensity of 100% is preferably used in order to determine the correction value profile for 100%.

In particular, errors of the image detector upon detection of print images may thus be compensated or corrected.

By detecting a second print image with an image detector that is intensity-calibrated over the scan width, the activation signals of the printer may be corrected such that, given the nominal inking intensity, the elements of the printers, such as print nozzle, print head, and/or print bar, generate essentially identical inking intensities on the recording medium that correspond to said nominal inking intensity. For this purpose, the second print image is preferably applied onto the recording medium with a primary color of the printer, wherein a constant activation intensity is applied at least at one element of the printer to generate a second nominal inking intensity. At the same print bar, this uncorrected printer thus generates on the recording medium a 30% inking intensity at a first print head, for example, and a 40% inking intensity at the second print head, for example, in spite of identical activation intensity. These differences may arise from differing wear and/or manufacturing tolerances etc. This second print image may be detected by an intensity-calibrated image detector. The actual intensities of the inked surfaces of the second print image are subsequently detected by the image detector. The differences in the inking intensities that are detected by the image detector thus originate exclusively from the elements of the printer.

The second print image is preferably printed with a single primary color of the printer, wherein the detection of correction values may be implemented separately for each primary color (for example cyan, magenta, yellow). A plurality of different inking intensities of one primary color may also be printed per line or per region, which inking intensities are then detected with the aid of the image detector, wherein corresponding correction value profiles for at least one element of the image detector are determined for each second nominal inking intensity.

In particular, errors of the printer upon printing print images may thus be compensated or corrected.

In an exemplary embodiment, a Red-Green-Blue (RGB) line camera that is integrated into the printing system is used as an image detector. Such a camera is also referred to as an inline RGB camera. The print image may hereby be printed at a different resolution than the per-dot detection via the RGB line camera. In particular, the RGB line camera may detect the print image with a resolution of 600 dpi over the entire width of the print image, wherein the print image may be printed with a resolution of 1200 dpi. The image regions detected per dot by the image detector comprise two print dots printed with the aid of the print head per pixel of the image detector, such that the adaptation of the inking intensity takes place based on the detected print image for two print nozzles given use of an inkjet printing apparatus.

FIG. 1 shows a schematic side view of a printing device 10 for printing to a recording medium 12 in the form of a web. In the exemplary embodiment, the printing device 10 is executed as a known inkjet printing device. Such a printing device is known from the document DE 10 2014 106 424 A1, for example.

Figure 2:
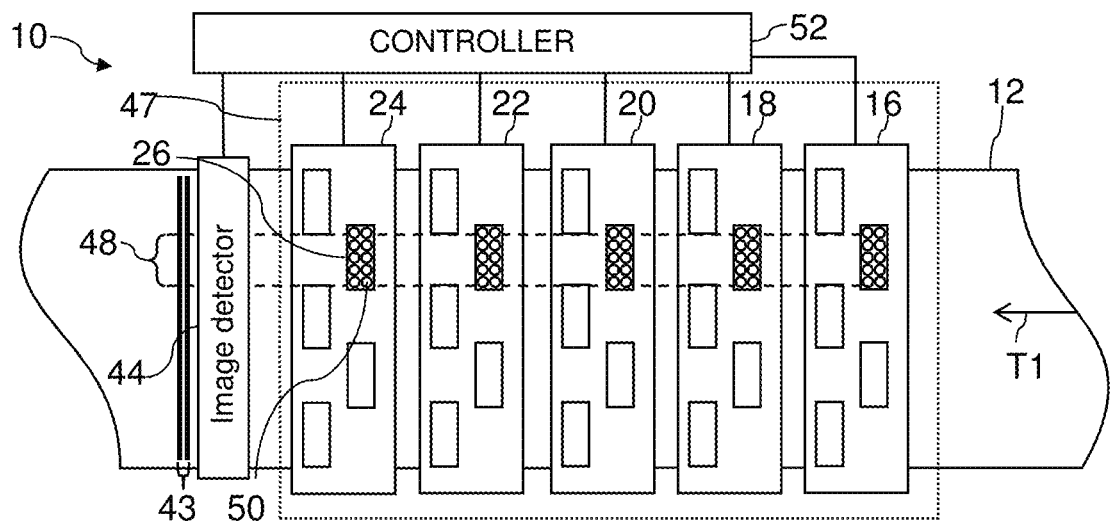
FIG. 2 illustrates a schematic plan view of the printing device according to FIG. 1.

The printing device 10 has per primary color at least one print bar 18 to 24 having one or more print heads 26 depicted in FIG. 2, which print bars are arranged transverse to a transport direction T1 of the continuously drivable recording medium 12 in the form of a web. The recording medium 12 may be made of paper, paperboard, cardboard, textile, a combination thereof, and/or other media that are suitable and can be printed to.

As an alternative to continuously supplied recording media 12 in the form of a web, recording media in the form of sheets may also be supplied to the printing device 10 for printing. Furthermore, the printing device 10 may alternatively be designed as an electrographic printing device or as an offset printing device.

The recording medium 12 is directed through the printing device 10, and thereby below and past the print bars 16 to 24 having the print heads 26 via infeed rollers 28, 30 and a plurality of guide rollers 32 to 42, wherein the print heads 26 apply a print image 43 onto the recording medium 12 in the form of print dots. In FIG. 2, the print image 43 is depicted by way of example as two parallel bars printed over the printable width of the recording medium 12.

The printed print image 43 is detected per line or per region over the entire printable width of the recording medium 12 with the aid of an image detector 44.

With the aid of an outfeed roller 40, the recording medium 12 is directed further to a drying (not shown) and, if applicable, to a subsequent further printing device in which in particular the back side of the recording medium 12 may be printed to. The recording medium 12 may subsequently or alternatively be supplied to a post-processing in which the recording medium 12 is cut, folded, and/or ultimately processed in other work steps.

Four primary colors are typically used for full-color printing, and in fact CMYK (Cyan, Magenta, Yellow, and Black). Additional primary colors, for example green, orange, or violet, may expand the color space of the printing device 10. Moreover, still more colors or special inks may be present, such as MICR ink (Magnetic Ink Character Recognition=magnetically readable ink). Each primary color is printed with the print heads 26 of a single print bar 18 to 24 onto the recording medium 12. It is likewise possible that transparent special fluids, such as primer or drying promoter, are similarly applied digitally with the aid of a separate print bar, before or after the printing of the print image 43, in order to improve the print quality or the adhesion of the ink on the recording medium 12. In the exemplary embodiment according to FIG. 1, a primer fluid is printed onto the recording medium 12 with the aid of the print bar 16.

FIG. 2 shows a schematic plan view of the printing device 10 according to FIG. 1. The print bars 16 to 24 form a printer 47. Each of the print bars 16 to 24 of the printing device 10 can print the full line width. For this purpose, each print bar 16 to 24 may comprise a plurality of print heads 26 that are arranged side by side in two rows with clearance.

In FIG. 2, each print bar 16 to 24 comprises a plurality of print heads 26 (five are depicted here in FIG. 2) in order to apply the print image 43 onto the recording medium 12 in a plurality of columns 48. Each print head 26 comprises a plurality of print nozzles 50 (for simplification, only ten print nozzles are depicted in FIG. 2), whereby each print nozzle 50 may apply ink droplets of a variable volume onto the recording medium 12 in the form of print dots. In practice, each print head may comprise multiple hundreds to multiple thousands of print nozzles directed toward the recording medium 12. The print nozzles 50 are arranged in multiple rows transverse to the printing direction T1. With the aid of the print nozzles 50 of a print head 26, a print image 43 may be printed over a portion of a line along the printable width of the recording medium 12 and in the form of a column 48 over the length of the recording medium 12 in the printing direction T1. A region of the recording medium 12 below the print head 26 is thereby printed to by each print head 26.

In other embodiments, each print head 26 has only a single row of print nozzles 50; in this instance, only a portion of a line of the recording medium 12 is printed to below the print head 26.

Each print dot along a line across the printable width of the recording medium 12 is printed by the corresponding print nozzle 50 of the print bar 18 to 24. The print resolution in the print line direction (transverse to the transport direction T1) is thus determined by the spacings [pitches] of the print dots relative to one another, said print dots being printed on the recording medium 12 by the print nozzles 50. By contrast, given single-line print heads, the print resolution in the transport direction T1 is determined by the transport velocity of the recording medium 12 and the line timing of the print heads 18 to 24 given line-clocked printing. Given a plurality of print nozzle rows, the print resolution in the transport direction T1 is dependent on the spacing of the print nozzle rows relative to one another.

In the printing device 10 according to FIGS. 1 and 2, the print heads 16 to 24 are arranged stationary. In other embodiments, the print heads 16 to 24 may also be arranged so as to be movable transverse to the printing direction T1.

With the aid of a controller 52, the individual print heads 26 of the print bars 18 to 24 are activated based on rastered print data so that the individual ink droplets are applied at the position of the recording medium 12 as defined by the print data. The individual ink droplets form individual print dots on the recording medium, which print dots in their entirety form the print image 43 on the recording medium 12.

The area coverage of the print dots in a region of the recording medium 12 determines the inking intensity in this region. Given complete inking of the recording medium 12, the inking intensity is 100%. Given half-inking of the recording medium 12, the inking intensity is 50%. In the event that no inking of the recording medium 12 takes place in the region, the inking intensity is 0%.

Figure 3:
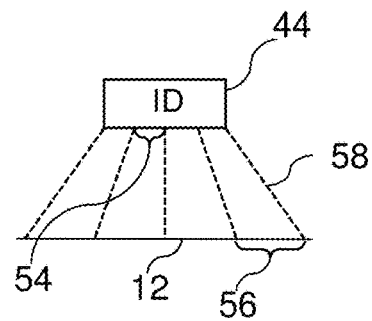
FIG. 3 illustrates an image detector, according to an exemplary embodiment, and a recording medium, for detecting print images printed on the recording medium.

FIG. 3 shows a schematic arrangement of the image detector 44 and the recording medium 12 for detection of print images 43 printed onto the recording medium 12. The image detector 44 has a plurality of light-sensitive dot detection regions 54 arranged in at least one row. The dot detection regions 54 respectively comprise sensor elements for detecting the brightness of the impinging light in the colors red, green, and blue (RGB). A separate color channel of the image detector 44 is thereby associated with each color (RGB). An image region 56 having one or more print dots of the print image printed onto the recording medium 12 is detected with the aid of a dot detection region 54. For each image region 56, the image detector 44 thus detects an optical mapping of the print dots on a light-sensitive dot detection region 54. Each dot detection region thereby has a field of view 58 directed toward the recording medium 12. The print image 43 is detected over the entire printable width of the recording medium 12 with the aid of a plurality of dot detection regions 54 arranged side by side in at least one row. In FIG. 3, for a simpler presentation only four dot detection regions 54 are shown. In an exemplary embodiment, the image detector 44 includes processor circuitry that is configured to perform one or more operations and/or functions of the image detector 44.

Depending on the number of dot detection regions 54 of the image detector 44, typically a plurality of print dots of the print image 43 are detected in an image region 56. With the aid of the image detector 44, a brightness value in the RGB color channels of the image detector may be determined for the respective image region 56 of the print image 43 based on the area coverage of the print dots in said image region 56. A value of the inking intensity in a primary color of the printer 47 and/or image detection region for the image region 56 may be associated with this brightness value.

In an exemplary embodiment, the image detector 44 is embodied as a line camera, for example an allPixa Pro camera from the vendor Chromasens that detects the print image 43 line by line. The line camera is configured to detect a line of the print image 43 with a plurality of light-sensitive image detection regions 54 arranged side by side, in particular in the form of a CCD, CMOS, NMOS, or InGaAs sensor. For example, the allPixa Pro line camera has three rows with respectively 4096 dot detection regions 54.

Dot detection regions 54 are also referred to as pixels. Brightness values in a respective color channel of the image detector 44 are detected by each image detection regions 54.

In an exemplary embodiment, controller 52 is configured to compare the print images 43 with the print data, where the print images 43 is detected in the form of image regions 56 with the aid of the image detector 44, and to establish an association of image regions 56 with print dots. Furthermore, the controller 52 is configured process and store values for the image detector 44 and the print heads 26, for example brightness values, correction values, and reference values. The controller 52 is thereby capable of implementing corrections to detected print images as is described in the following using FIG. 4 and FIG. 5. In an exemplary embodiment, the controller 52 includes processor circuitry that is configured to perform one or more operations and/or functions of the controller 52.

Figure 4:
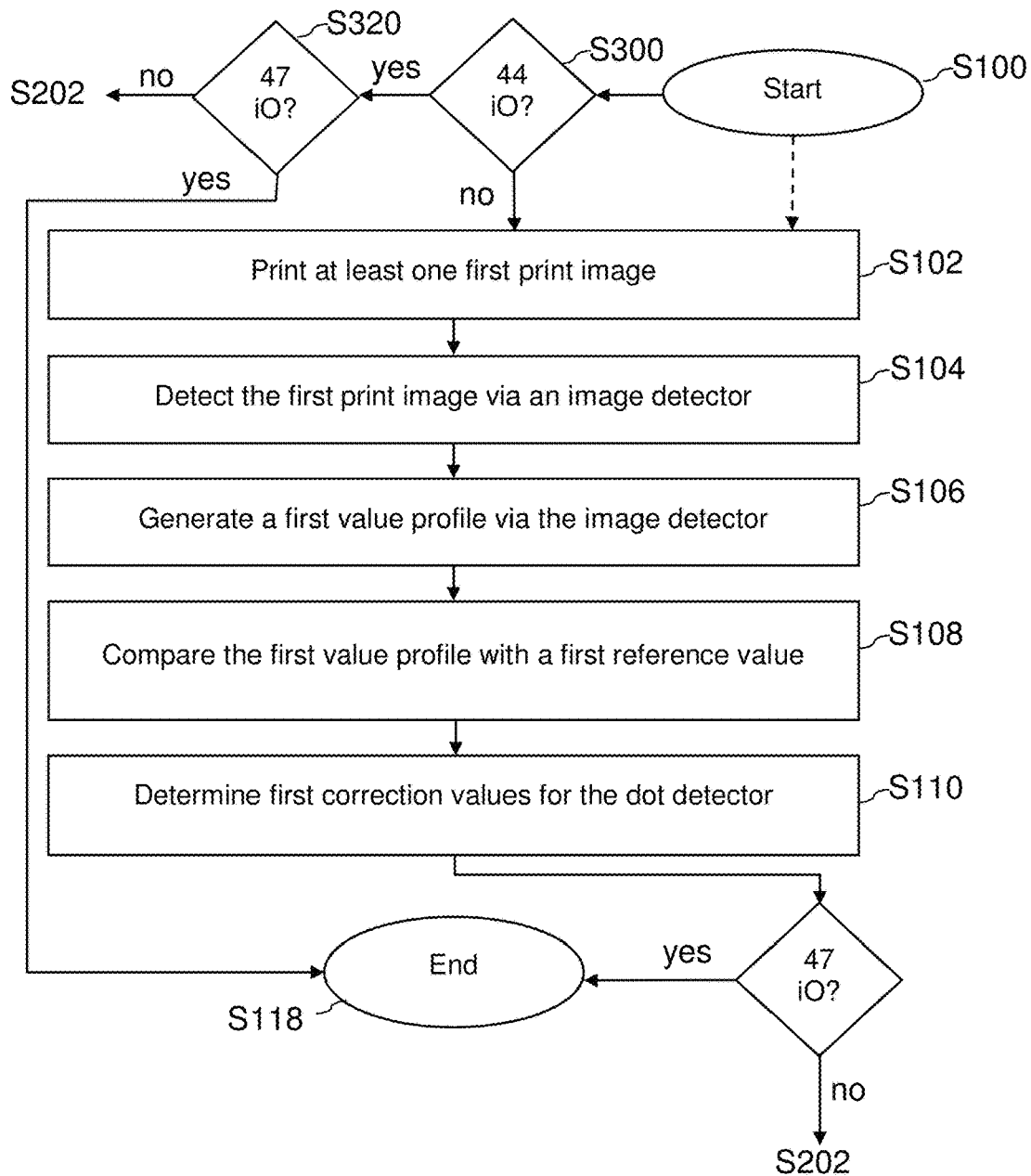
FIG. 4 is a flowchart of a method for correcting the image detector according to an exemplary embodiment.

FIG. 4 shows a workflow diagram of a method for correcting an image detector 44. The workflow starts in step S100.

In step S102, a first print image 43a is then printed by the printer 47 onto the recording medium 12. A first inking intensity of the first print image 43a is thereby printed uniformly, and preferably in a range of between 90% and 100%, over the entire printable width of the print image 43. The first print image 43a is printed in a single primary color, preferably in yellow or black. This may be the primary color of the printer 47 and/or of the detector 44. It has thereby been shown that, in spite of manufacturing or aging-related tolerances of the printer, the inking intensity is thereby applied constantly onto the recording medium over the width of the first print image 43a. Calibrated spectral photometric measurements confirm this.

In the next step S104, the first print image 43a printed onto the recording medium 12 is detected line by line, transverse to the printing direction T1, with the aid of the image detection regions 54 of the image detector 44. In step S106, a value profile for the dot detection regions 54 of the detected brightness in at least one color channel (RGB) of the image detector 44 is thereby determined for each detected image region 56. The brightness value of the blue channel of the image detector 44 is preferably determined.

In step S108, the individual values from the first value profile are compared with a first reference value. The first reference value may be taken from the data stream of the print data, for example. The inking intensity stored in the data stream of the print data then corresponds to the first reference value. An absolute adaptation may then be implemented with this reference value.

The first reference value may also be determined by means of measurement technology. It is thereby known that the value profile output by the image detector in particular deviates most strongly at the edge regions A and B (see FIG. 6). These edge regions A and B are masked in order to be averaged over the intervening (inking intensity) values. This mean value then corresponds to the first reference value 66. Only a relative adaptation may be implemented with this reference value since the mean value may deviate up or down by a constant value relative to the inking intensity stored in the data stream of the print data.

In step S110, a correction value for the respective image detection regions 54 is determined depending on the comparison. The correction value may also have a value of zero if no deviation is present. These correction values are stored in the form of a correction value table or a function, such that the image detector 44 outputs an essentially constant (brightness) value profile given a print image with constant inking intensity (see FIG. 7).

This method may be repeated for different inking intensities. The inking intensity printed onto the recording medium 12 is 80% in the first instance, for example. Corresponding correction values for the image detector are calculated for this. The inking intensity printed onto the recording medium 12 is 85% in the next instance, for example. Corresponding correction values for the image detector are then calculated for this, and so on. The interval width of 5% that is chosen here is only an example. It is therewith possible to calibrate or correct the image detector for different inking intensities. The inking intensities that are now determined by the corrected image detector 44 correspond to the inking intensities predetermined by the print data.

Figure 5:
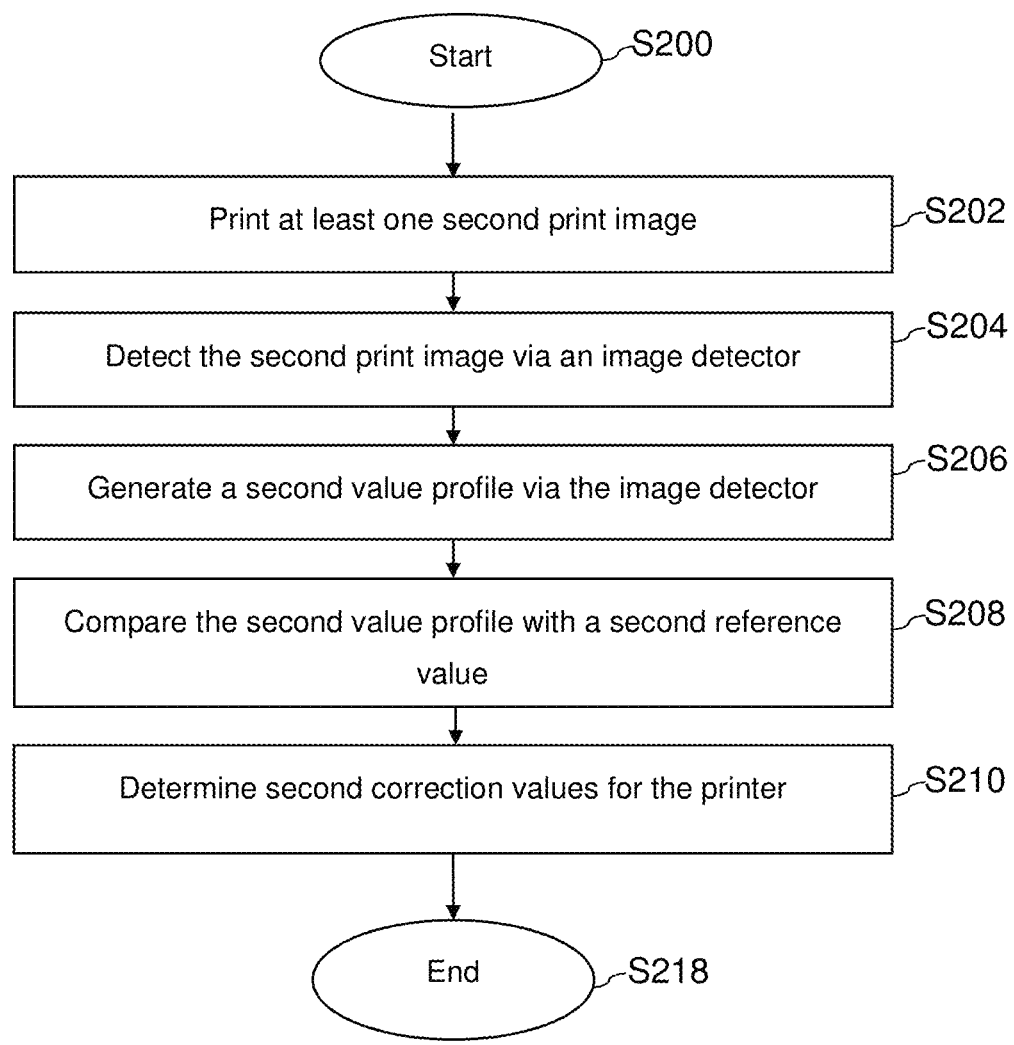
FIG. 5 is a flowchart of a method for correcting an activation of a printer according to an exemplary embodiment.

FIG. 5 shows a workflow diagram of a method for correcting the activation of a printer 47 to generate print images 43. The workflow starts with step S200.

In step S202, a second print image 43b is then printed with a second nominal inking intensity by the printer 47. The second print image 43b is printed in a single primary color, preferably in yellow or black. This may be the primary color of the printer 47 and/or of the detector 44. In step S204, with the aid of the image detector 44 the second print image 43b is detected that outputs an essentially constant value profile over all dot detection regions 54 given a constant inking intensity on a recording medium. Such an image detector 44 may exhibit such a rating or quality due to its manufacturing. In contrast to this, if the image detector 44 does not output a constant value profile given a constant inking intensity on the recording medium, an image detector 44 of poorer rating may be calibrated or corrected by means of the method described in FIG. 4. The rating or quality with regard to the reproduction of a constant inking intensity of the image detector 44 may, if necessary, be checked in advance in step S300 (see FIG. 4).

In a next step S204, the second print image 43b printed on the recording medium 12 is detected line by line, transverse to the printing direction T1, with the aid of the dot detection regions 54 of the image detector 44. In step S206, for each detected image region 56 a value profile is thereby subsequently determined of the detected brightness in at least one primary color (CMYK) of the printer 47 for the print nozzles 50, for at least one print head 26, and/or at least one print bar.

In step S208, the individual values from the value profile are compared with a second reference value. The second reference value may be taken from the data stream of the print data, for example. The inking intensity stored in the data stream of the print data (also referred to as a second nominal inking intensity) then corresponds to the second reference value. The corresponding print dots and/or print nozzles 50 of the print head 26 may therewith be associated with the image region 56. Moreover, differences in the inking intensity may be established that, for example, are dependent on the print head.

In step S210, a correct value for the respective print nozzle 50, for at least one print head 26, and/or for at least one print bar is determined depending on the comparison. The correction value may also have a value of zero if no deviation is present. These correction values are stored in the form of a correction value table or a function, such that the printer 47 is configured to apply the inking intensity stored in the data stream onto the recording medium.

For this purpose, the data stream may be adapted with these correction values. It is likewise conceivable that the correction values are stored in the controller 52 of the print head and/or of the print bar. Differences in the inking intensity that are due to the print head can therewith be compensated. As an alternative to this, the second correction values may also be determined with the aid of the procedure disclosed in the document DE 10 2013 107 942 A1.

This method may be repeated for different inking intensities. The inking intensity printed onto the recording medium 12 is 80% in the first instance, for example. Corresponding correction values for this are calculated for the printer. The inking intensity printed onto the recording medium 12 is 75% in the next instance, for example. Corresponding correction values for printer 47 are then calculated for this, and so on. The interval width of 5% that is selected here is only an example. With this, it is possible to calibrate or correct the printer 47 for different inking intensities. The inking intensities that are now applied by the corrected printer 47 correspond to the inking intensities predetermined by the print data.

The method depicted in FIG. 5 may be executed on its own if an inking intensity deviation is only suspected in the printer 47.

Upon starting up a printer, in step S300 the quality of the image detector 44 should be checked. If the quality of the image detector 44 is not sufficient in step S300, this must be corrected. After the correction of the image detector 44 using steps S102 through S110 (see FIG. 4), in step S320 it is checked whether the printer 47 delivers inking intensities corresponding to the print data. If this is not so, the method in FIG. 5 with steps S202 through S218 is executed.

If the quality of the image detector 44 in step S300 is sufficient, the quality of the printer 47 is checked in step S310 (as in step S320). If this is not so, the method with steps S202 through S218 in FIG. 5 is executed.

Figure 6:
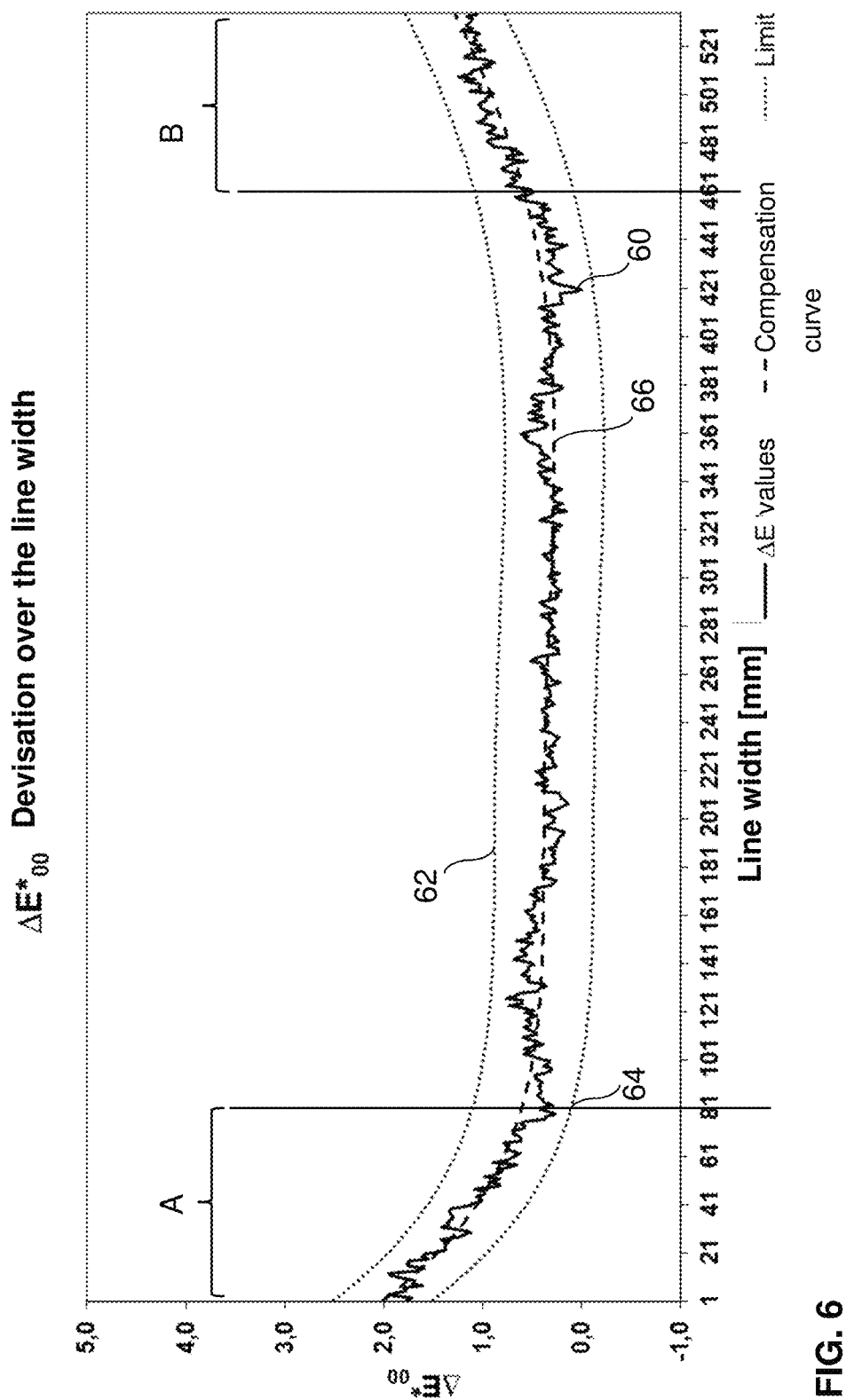
FIG. 6 illustrates a plot of a curve of the inking deviation over the line width of the printed recording medium, without a correction of the image detector, according to an exemplary embodiment.

FIG. 6 shows a diagram with the curve of the inking intensity deviations over the line width of the recording medium 12 from an uncorrected image detector 44. The diagram shows the inking intensity deviation according to the comparison that took place in step S108. The difference of the first reference value and the individual inking intensity values from the first reference profile is thereby depicted. The deviation between the inking intensities that, for example, are to be expected from the print data and the inking intensities measured by the image detector 44 is indicated as a $\Delta E$ value 60. Inking intensity deviations across the line width are especially apparent in an edge region A of the line width from 1 mm to 81 mm, and in an edge region B of the line width from 461 mm to 540 mm. A target range for a maximum deviation with upper limit 62 and lower limit 64 is depicted around the compensation curve 66. For example, the inking intensity deviations between 82 mm and 460 mm may be averaged in order to calculate a first (relative) reference value from a print image.

Figure 7:
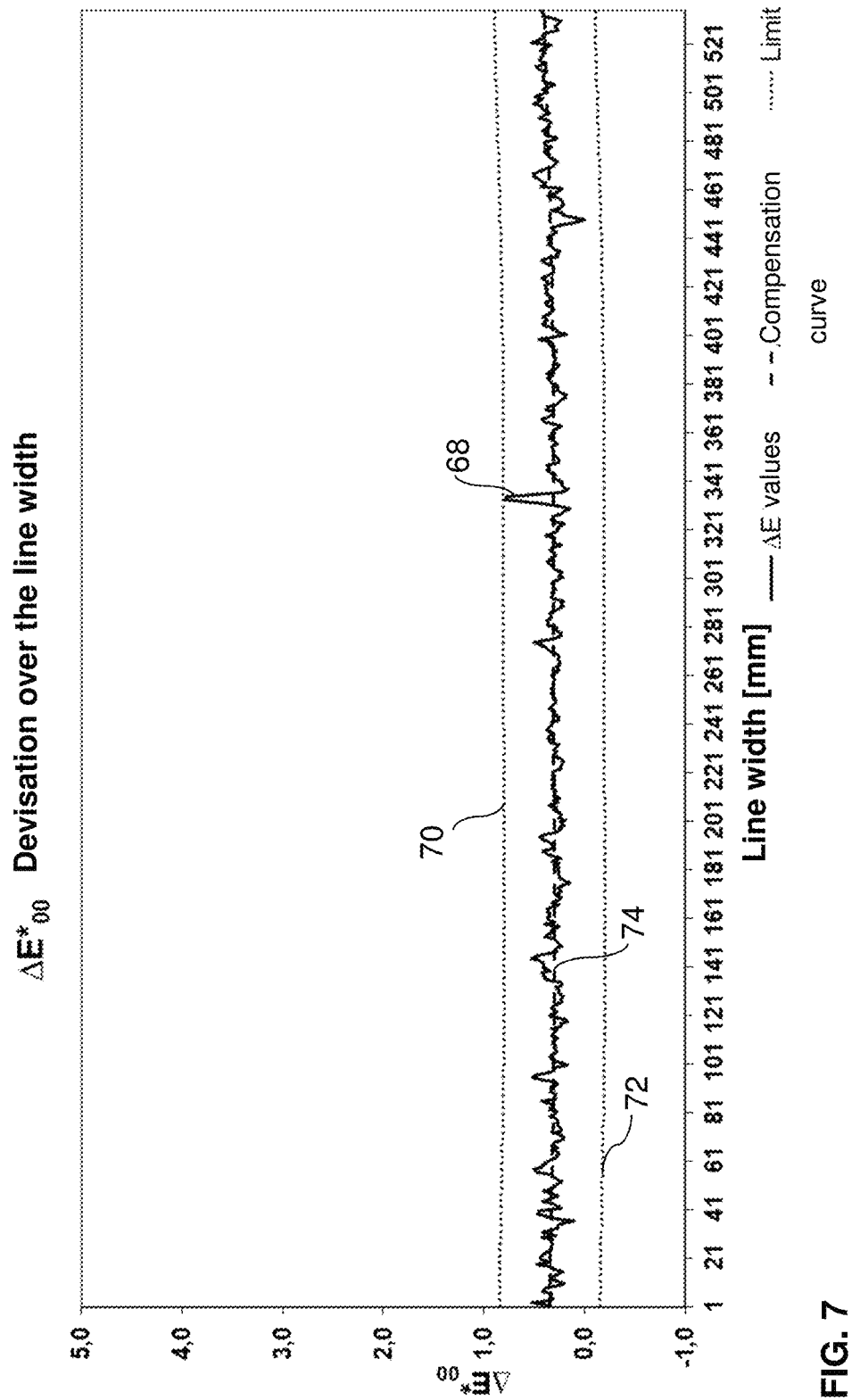
FIG. 7 illustrates a plot of a curve of the inking intensity deviation over the line width of the printed recording medium, with correction from an image detector, according to an exemplary embodiment.

FIG. 7 shows a diagram with the curve of the inking intensity deviation over the line width of the recording medium 12 from a corrected image detector 44 that, in the uncorrected state, delivers the diagram illustrated in FIG. 6. The diagram thus shows the inking intensity deviation after a correction with the method according to FIG. 4. A target range for a maximum deviation with upper limit 70 and lower limit 72 is shown around the compensation curve 74.

An improved correction of the nozzle activation is achieved via the methods according to FIGS. 4 and 5, such that qualitatively high-grade print images 43 may be printed.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 10 printing device
12 recording medium 16 to 24 print bars
26 print head
28, 30 infeed roller
32 to 42 deflection roller
43 print image
44 image detector
46 outfeed roller
47 printer
48 column of the print image on recording medium
50 print nozzle
52 controller
54 image detection region/dot detection region
56 image region
58 field of view of the image detection regions
60 deltaE value without correction
62, 70 upper limit
64, 72 lower limit
66, 74 compensation curve
68 deltaE value with correction

The invention claimed is:

1. A method for improving print image uniformity, comprising:
   printing at least one print image using a printer having at least one print bar that has at least one print head with a plurality of print nozzles;
   generating a value profile of measured inking intensities based on the at least one print image detected by an image detector having a plurality of dot detection regions; and
   generating correction values based on a comparison of the value profile with at least one reference value using a comparator, wherein:
to calibrate the image detector:
   (a) at least one first print image is printed by the printer with a first real inking intensity that is constant on the recording medium over the width of the first print image;
   (b) the at least one first print image is detected by the image detector to generate at least one first measured value profile; and
   (c) the first value profile is compared with a first reference value, by the comparator, to determine and store first correction values for the image detector; and/or
to calibrate the printer:
   (d) at least one second print image is printed by the printer with a second nominal inking intensity that is constant on the recording medium over the width of the second print image;
   (e) the second print image is detected by the image detector to generate at least one second measured value profile that outputs a constant value profile across all of the plurality of dot detection regions given a constant inking intensity on the recording medium; and
   (f) the second measured value profile is compared with a second reference value by the comparator to determine and store second correction values for the plurality of print nozzles, the at least one print head, and/or the at least one print bar.

2. The method according to claim 1, wherein the second nominal inking intensity is less than the first real inking intensity.

3. The method according to claim 1, wherein the second measured value profile according to step (e) is adapted based on the first correction values determined for the first real inking intensity, before step (f).

4. The method according to claim 1, wherein steps (a) through (c) are executed in response to a brightness sensitivity of at least one primary color of the image detector from at least two of the plurality of dot detection regions not being constant, and steps (d) through (f) are executed independently thereof and corresponding thereto.

5. The method according to claim 1, wherein:
   the first reference value corresponds to the first real inking intensity, and/or
   the second reference value corresponds to the second nominal inking intensity.

6. The method according to claim 5, wherein the first real inking intensity is between 80% and 100%.

7. The method according to claim 1, wherein steps (a) through (b) are repeated with identical first real inking intensities to obtain a plurality of first value profiles, a first mean real inking intensity being calculated based on the plurality of first value profiles.

8. The method according to claim 1, wherein:
   steps (a) through (c) are repeated with different first real inking intensities to obtain a plurality of first value profiles that are dependent on the set first real inking intensity, or
   steps (d) through (f) are repeated with different second nominal inking intensities to obtain a plurality of second value profiles that are dependent on the set second nominal inking intensity.

9. The method according to claim 1, wherein:
   the first print image is printed with a primary color of the image detector, or
   the second print image is printed with a primary color of the printer.

10. The method according to claim 1, wherein:
    a corresponding one of the plurality of dot detection regions is identified as defective if at least one first measured inking intensity exceeds a first upper threshold and/or falls below a first lower threshold, and/or
    a corresponding one of the plurality of print nozzles, the at least one print head, and/or the at least one print bar is identified as defective if at least one second measured inking intensity exceeds a second upper threshold and/or falls below a second lower threshold.

11. The method according to claim 1, wherein:
    the first reference value corresponds to the first real inking intensity, and
    the second reference value corresponds to the second nominal inking intensity.

12. The method according to claim 1, wherein:
    steps (a) through (c) are repeated with different first real inking intensities to obtain a plurality of first value profiles that are dependent on the set first real inking intensity, and
    steps (d) through (f) are repeated with different second nominal inking intensities to obtain a plurality of second value profiles that are dependent on the set second nominal inking intensity.

13. The method according to claim 1, wherein:
    the first print image is printed with a primary color of the image detector, and
    the second print image is printed with a primary color of the printer.

14. The method according to claim 1, wherein:
    a corresponding one of the plurality of dot detection regions is identified as defective if at least one first measured inking intensity exceeds a first upper threshold and/or falls below a first lower threshold, and
    a corresponding one of the plurality of print nozzles, the at least one print head, and/or the at least one print bar is identified as defective if at least one second measured inking intensity exceeds a second upper threshold and/or falls below a second lower threshold.

15. A non-transitory computer-readable storage medium with an executable program stored thereon, wherein, when executed, the program instructs a processor to perform the method of claim 1.

16. A device for improving the print image uniformity, comprising:
- a printer including at least one print bar having at least one print head with a plurality of print nozzles, the printer being configured to print at least one print image;
- an image detector with a plurality of dot detection regions and configured to generate at least one value profile of measured inking intensities; and
- a comparator configured to generate correction values based on a comparison of the value profile with at least one reference value, wherein:

to calibrate the image detector:
(a) a first print image is generated by the printer with a first real inking intensity, wherein an inking intensity on a recording medium is constant over a width of the first print image;
(b) the image detector detects the first print image to generate a first measured value profile; and
(c) the comparator compares the first measured value profile with a first reference value to determine and store first correction values for the image detector, and/or to calibrate the printer:
(d) a second print image is generated by the printer with a second nominal inking intensity, wherein the second nominal inking intensity on the recording medium is constant over a width of the second print image;
(e) the image detector detects the second print image to generate a second measured value profile, wherein the image detector outputs a constant value profile across all of the plurality of dot detection regions given a constant inking intensity on the recording medium; and
(f) the comparator compares the second measured value profile with a second reference value to determine and store second correction values for the plurality of print nozzles, the at least one print head, and/or the at least one print bar.

* * * * *